Oct. 18, 1932.         S. CREWE              1,883,767
RATCHET MECHANISM
Filed Aug. 26, 1927
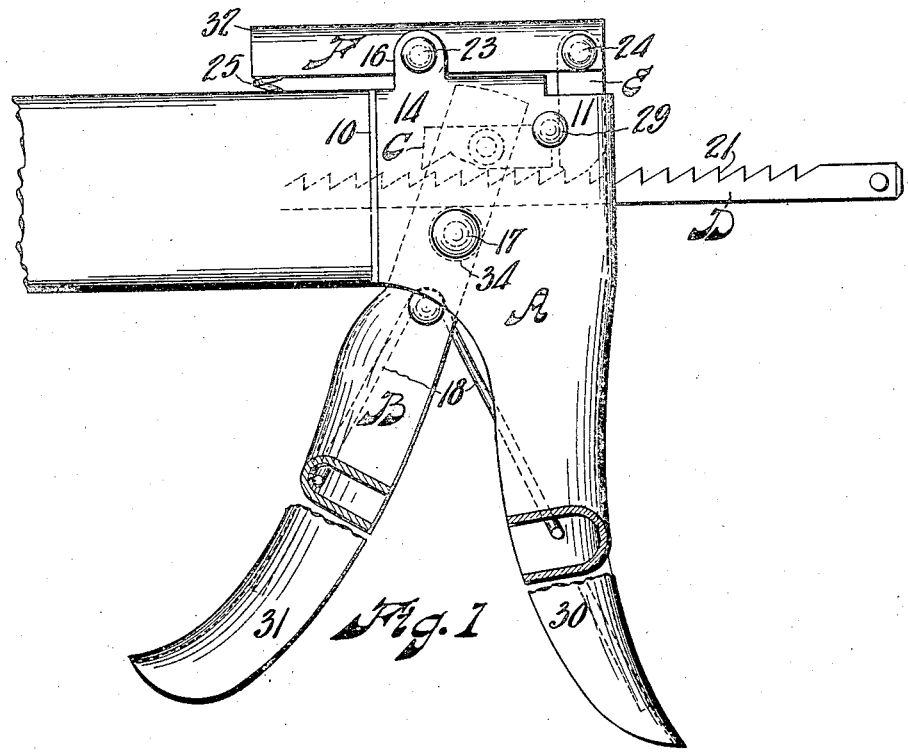
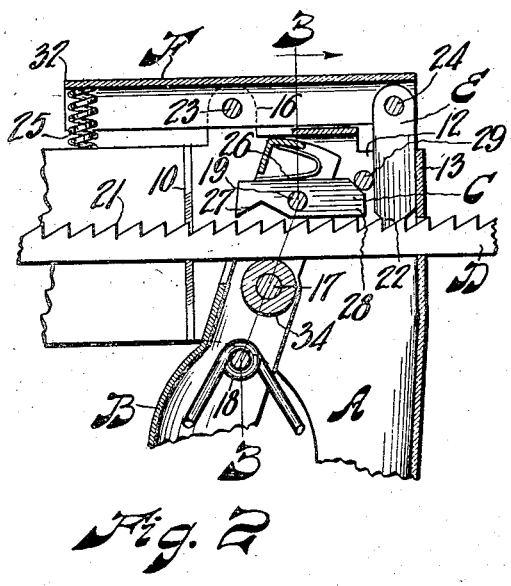
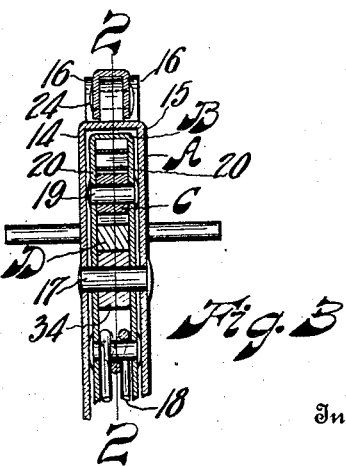
Inventor
Samuel Crewe
By C. F. Heinkel,
Attorney Patented Oct. 18, 1932

1,883,767

UNITED STATES PATENT OFFICE

SAMUEL CREWE, OF EAST CLEVELAND, OHIO

RATCHET MECHANISM

Application filed August 26, 1927. Serial No. 215,598.

My invention relates to mechanisms having rack and pawl elements to move elements in relation to each other.

One of the objects of my invention is a simple, inexpensive, and easily operable mechanism for moving a bar or similar element longitudinally in one direction and automatically preventing the bar from moving in the opposite direction and manually releasing the bar so that the same can be moved manually in both directions. Other objects will appear, or become apparent or obvious, or will suggest themselves during the description of the apparatus or device shown in the accompanying drawing in which:—

Fig. 1 is a side view of a device having a ratchet mechanism embodying my invention.

Fig. 2 is a longitudinal section taken in a vertical plane indicated by the line 2—2 in Fig. 3 and shows more clearly the interior relations of the parts.

Fig. 3 is a transverse section taken in a vertical plane indicated by the line 3—3 in Fig. 2 and shows more clearly the interior relations of the parts in a traverse plane.

Similar reference characters refer to similar parts throughout the views.

The frame member A is made of sheet metal bent into a desirable form, is hollow, and has the end 10 attachable to an associated device and a pocket defined by the walls 11, 12, and 13 and also has the side walls 14 and 15 and the ears 16 thereon.

The operating member B is made of sheet metal bent into desirable form, is hollow, and extends into the hollow of the frame member and is pivoted in the frame member by means of the pin 17 which is supported in the walls 14 and 15. The spring 18 is supported in the member B and the free ends thereof contact the members A and B and respectively and thereby normally tends to hold the lower portions of these members apart.

The pawl C is located in the hollow of the member B and is pivoted on the pin 19 which is supported in the walls 20 of the member B.

The bar D is movable longitudinally and extends through the hollow of the member B and is guided laterally or sidewise, by the walls of the member A and has the teeth 21 and is located in proper relation to the pawl and is supported in that relation by the roller 34 journaled on the pin 17 and is easily movable on this roller.

The dog E extends into the pocket mentioned and is held in position laterally by means of the walls 11, 12 and 13 and has the nose or tooth 22 adapted to the teeth 21. The dog release member F is made of sheet metal bent into suitable form and is pivoted on the frame member by means of the pin 23 supported in the ears 16 and one end thereof is pivoted onto the outer end of the dog E by means of the pin 24. The spring 25 extends between the other end of the member F and the frame member and normally tends to keep or hold the nose 22 in engagement with the teeth 21.

The spring 26 is inserted between the operating member B and the pawl C and normally tends to keep or hold the nose or tooth 27 on one end of the pawl C in engagement with the teeth 21 while the tail 28 on the other end of the pawl C is beveled and adapted to engage the abutment pin 29 which is supported in the walls 11 and 12 of the frame member.

In operation:—

The handle portion 30 of the member A, of U shaped form cross-sectionally with the opening of the U facing the operating member B, affords a means for firmly taking hold of the device. The handle portion 31 of the member B, of U shaped form cross-sectionally with the opening of the U facing the handle of the frame member, affords a means for operating the device in an easy and convenient manner and is normally held away from the portion 30 by means of the spring 18. While the portion 31 is so held away from the portion 30, the tail 28 of the pawl C engages the underside of the pin 29 and thereby holds the nose 27 of the pawl out of engagement with the teeth 21 to permit the bar D to be moved longitudinally in both directions when the dog E is also out of engagement with the teeth 21.

When the end 32 of the member F is moved toward the member A, the nose 22 moves out of engagement with the teeth 21 and thereby permits the free longitudinal movement of the bar D in both longitudinal directions while the portion 31 is held away from the portion 30.

When the handle 31 is moved toward the handle 30 on the pivot 17, against the action of the spring 18, the upper portion of the member B moves in the opposite direction and the pawl C moves with it bodily. When the pawl has so moved a short distance, the tail thereof leaves the abutment 29 whereupon the spring 26 forces the nose of the pawl into engagement with the teeth 21 and thereby moves the bar D longitudinally in one direction during the remainder of the movement of the handle 31.

When a force acts longitudinally on the bar D in a direction opposite to the just described longitudinal movement thereof, the nose on the dog E engages the teeth 21 and thereby prevents this force from moving the bar in the opposite direction since the body portion of the dog is confined laterally by the walls 11, 12 and 13 and the pin 29.

The bar D may be operatively connected to any desirable mechanism.

The sheet metal formation of the members affords an easy and convenient and economical means for locating members or parts within each other and connecting them with each other and results in light weight structure which is easy and convenient to handle.

I am aware that changes can be made in the structure as well as in the arrangement of the elements shown and described within the scope of the appended claims; therefore, without limiting myself to the precise structure and arrangement of elements as shown and described,

I claim:—

1. A mechanism of the character described including a hollow frame member made of sheet metal bent into suitable form and having two pivot pins supported in walls thereof, a hollow operating member made of sheet metal bent into suitable form and extending into the hollow of said frame member and pivoted on one of the pivot pins and having a pivot pin supported in walls thereof, a pawl in the hollow of said operating member and pivoted on said pivot pin of said operating member, a dog member extending into the hollow of said frame member and abutting laterally on a wall of said frame member, a dog release member pivoted on the other one of said pivot pins of said frame member and hinged to said dog member, and a longitudinally movable bar guided in walls of said frame member in operative relation with said pawl and dog members.

2. A device of the character described including a frame member and a handle thereon formed of sheet metal for minimum weight thereof and substantially U shaped cross-sectionally for hollowness thereof to receive other parts of the device for minimum size of the device, an operating member for the device formed of sheet metal for minimum weight thereof and substantially U shaped cross-sectionally for hollowness thereof to receive other parts of the device for minimum size of the device and extending into the hollow of said frame member and pivoted onto the same, a movable bar extending through the hollows of said frame and operating members, and operating mechanism for said bar extending into the hollows of said frame and operating members.

3. A ratchet mechanism of the character described including a frame member formed of sheet metal with a portion thereof of substantially U shaped cross-section to reduce the weight thereof and to provide space for other elements to extend into the hollow thereof, an operating member formed of sheet metal of substantially U shaped cross-section to reduce the weight thereof and to provide space for other elements to extend into the hollow thereof, a portion of said operating member disposed in the hollow of said frame member between the legs thereof, a pivot pin extending through the legs of the frame and operating members, the open ends of said U shaped parts facing each other, a spring having the free ends thereof disposed between the respective legs of said frame and operating members, and a pawl mechanism between the legs of the operating member.

4. A ratchet mechanism of the character described including a frame member formed of sheet metal with a portion thereof of substantially U shaped cross-section to reduce the weight thereof and to provide space for other elements to extend into the hollow thereof, an operating member formed of sheet metal of substantially U shaped cross-section to reduce the weight thereof and to provide space for other elements to extend into the hollow thereof, a portion of said operating member disposed in the hollow of said frame member, a pivot pin extending through the legs of the frame and operating members, the open ends of said U shaped parts facing each other, a spring having the free ends thereof disposed between the respective legs of said frame and operating members, a pawl mechanism between the legs of the operating member, a dog confined laterally in the hollow of said frame member, a release member formed of sheet metal of substantially U shaped cross-section to reduce the weight thereof and to provide space for other elements to extend into the hollow thereof, a pivot pin extending through walls of said frame member and through the legs of the release member, one end of said dog extending between the legs of said release member, and a spring extending in between the legs of said release member.

5. In a ratchet mechanism, a frame member, a pivot pin extending transversely through said frame member, an operating member extending into said frame member and pivotally supported by said pivot pin, a roller on said pin between the walls of said operating member, a longitudinally movable bar extending longitudinally through said frame and operating members and riding on said roller and permanently supported on said pivot pin, and a bar engaging pawl normally out of engagement with said bar and engaging the same opposite said roller for longitudinal movement of said bar upon manual movement of the operating member.

6. A mechanism of the character described including a frame member, a pivot pin extending transversely through said member, an operating member pivotally supported by said pivot pin, a toothed longitudinally movable bar extending longitudinally through said members, a releasable longitudinally movable dog normally engaging teeth on said bar to lock the same against movement in one direction, an abutment pin extending transversely through said frame member and confining one side of said dog, and a pawl pivoted onto said operating member and having a tooth on one end thereof normally out of engagement with teeth on said bar and adapted to engage teeth on said bar to move the same in the opposite direction upon operation of said operating member, and also having an abutment face on the other end thereof located to abut said abutment pin to release the tooth on said pawl from the teeth on said bar upon release of said operating member.

In testimony of the foregoing I affix my signature.

SAMUEL CREWE.